United States Patent [19]

Andersson et al.

[11] Patent Number: 4,853,293

[45] Date of Patent: Aug. 1, 1989

[54] COMPACTED METALLIC WIRE ELEMENT

[75] Inventors: Lars Andersson; Berndt Stenlund, both of Sandviken; Rolf Wiberg, Gävle, all of Sweden

[73] Assignees: Sandvik AB, Sandviken; Pio AB, Ockelbo, both of Sweden

[21] Appl. No.: 126,918

[22] Filed: Nov. 30, 1987

[30] Foreign Application Priority Data

Dec. 1, 1986 [SE] Sweden .............................. 8605137

[51] Int. Cl.$^4$ ...................... B23P 17/06; B65D 53/02
[52] U.S. Cl. .................................... 428/605; 277/236
[58] Field of Search ................. 428/605, 592; 419/24, 419/2; 29/419.1; 277/236

[56] References Cited

U.S. PATENT DOCUMENTS

| 1,851,237 | 3/1932 | Bradford | 428/605 |
| 1,862,263 | 6/1932 | Gottschelk | 428/605 |
| 2,017,231 | 10/1935 | Bradford | 428/605 |
| 2,462,316 | 2/1949 | Goodcoe | 428/605 |
| 3,469,297 | 9/1969 | Webber | 29/180 |
| 3,690,606 | 9/1972 | Pall | 428/605 |
| 4,514,458 | 4/1985 | Thorn et al. | 428/605 |

FOREIGN PATENT DOCUMENTS

| 2549321 | 5/1977 | Fed. Rep. of Germany . |
| 2428496 | 1/1980 | France . |
| 821690 | 10/1959 | United Kingdom | 428/605 |

OTHER PUBLICATIONS

A. G. Metcalfe et al., "Fiber Metallurgy", Metal Progress, Mar. 1955, pp. 81–84.
R. H. Read, "Fiber Metallurgy-A Progress Report", Materials in Design Engineering, Dec. 1959, pp. 104–106.
A. G. Metcalfe et al., "Fiber Metals-A New Metal Form", Materials & Methods, Nov. 1955, pp. 96–98.
C. L. Kobrin, "Fiber Metals-A New Adventure in Engineering Materials", The Iron Age, Jan. 1963, pp. 53–55.
"Fiber Metallurgy: New Opportunites for Metal Working", Steel, Aug. 10, 1959, pp. 126–128.
M. Sabanas, "Metal Fiber Composites", Product Engineering, May 1960, pp. 57–61.

Primary Examiner—John J. Zimmerman
Attorney, Agent, or Firm—Burns, Doane, Swecker & Mathis

[57] ABSTRACT

The invention relates to methods for producing a metallic element such as a gasket (12) or a filter. The production methods relate to compacting of a stud (10) of coiled wire (11) having a rectangular cross-section into a compacted metallic element (12) and sintering of said element at an elevated temperature. The wires of the compact and sintered metallic element (12) are mutually interlocked.

6 Claims, 2 Drawing Sheets

4,853,293

COMPACTED METALLIC WIRE ELEMENT

The present invention relates to methods for producing a metallic element and a metallic element therefrom.

BACKGROUND OF THE INVENTION

In a known method for producing gaskets for exhaust gas systems a web is used as basic material. The wire in the web has a mainly round cross-section and the web has a net like basic shape which has been rolled to a cylinder whose height is larger than its radius. When the cylinder is compacted in its longitudinal direction many wires are torn and furthermore each wire in the cylinder will cause a notch, due to the cross-section of the wire, in the adjacent wire, and therefore each wire will receive a large number of strength detoriating notches. The produced gasket will thus have limited mechanical properties, such as impaired elasticity due to torn wires, during use. These torn wires may easily become loose from the gasket such that it will achieve a poorer tightening function. The known method includes dipping of the compacted cylinder in a binder.

SUMMARY OF THE INVENTION

According to the present invention methods for producing a metallic element and metallic elements therefrom are provided in compliance with the appended claims.

An object of the present invention is to shape a metallic element in a quick manner.

Another object of the present invention is to provide a metallic element which has good mechanical, chemical and thermal properties.

Still another object of the present invention is to provide a metallic element which can be used several times.

Still another object of the present invention is to provide a strong gasket for sealing of two assembled machine elements.

Still another object of the present invention is to provide a strong filter.

Other objects and advantages of the present invention will be apparent from the following description taken in connection with the accompanying drawings.

DESCRIPTION OF THE PREFERRED EMBODIMENT

Figure 1:
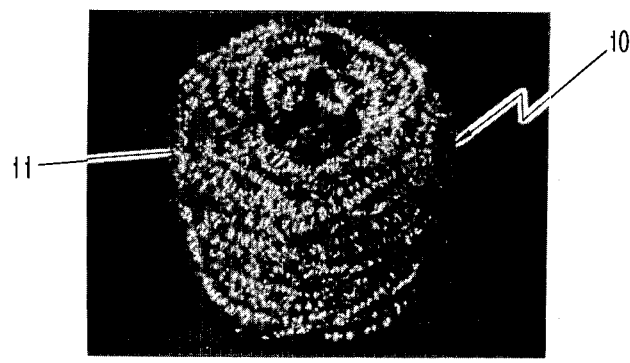
FIG. 1 shows a picture in a perspective view of the basic material.
Figure 2:
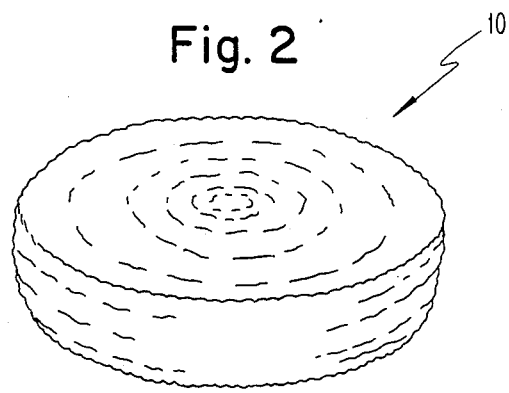
FIG. 2 shows a perspective view of the basic material.
Figure 3:
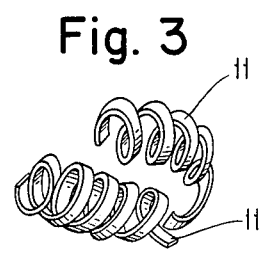
FIG. 3 shows a coil of the basic material.

FIGS. 1, 2 and 3 show the basic material of the metallic element, which is a stud 10 consisting of screw shaped wire 11 with a mainly rectangular cross section. The wire 11 is made from heat and acid resistant, alloyed, steel or austenitic or ferritic steel. The wire 11 is coiled, i.e. it is bent in a screw shape along its longitudinal axis. The stud 10 is produced by winding the coiled wire around a journal whereby the diameter of the stud increases for each revolution of the journal. Each stud 10 preferably consists of two screw-shaped wires, as seen in FIG. 3. The wire is long and has a thickness which do not exceed 0.40 mm, preferably it is between 0.030 and 0.300 mm thick. The wire has about 10 to 20 loops per centimeter coiled wire. One centimeter of coiled wire comprises about 10 centimeters of wire.

The stud 10 has a center axis and may have a central hole where said journal previously was situated.

FIGS. 4 to 7 show a gasket 12 according to the invention. The gasket is primarily provided to seal between a branch pipe of a combustion engine and an exhaust pipe (not shown). The gasket may have other zones of application. The gasket has a circular basic shape and has a central recess through which exhaust gases are to be transferred.

When producing the gasket 13 (FIG. 4) the stud 10 is compacted under pressure sufficient to locally achieve plastic deformation of individual wires between two parts of a compacting tool (not shown), i. e. a punch and a die. The minimum pressure is about $0.2$ $N/mm^2$ and the maximum pressure is about 50 $N/mm^2$. Since the wires 11 are coiled (in the meaning of screw shaped) the coils will be moved into each other and hook on to each other during the compacting process. The wires however may have a certain movability in radial direction relative to the center line of the punch and the die during compacting. A high temperature apparatus (not shown) is arranged to sinter parts of the wires together. The productions methods for manufacturing the gasket is more closely described below.

Figure 5:
FIG. 5 shows a cross section of the gasket in magnification.
Figure 7:
FIGS. 6 and 7 show parts of the surface of the gasket in further magnification.
Figure 6:
Figure 4:
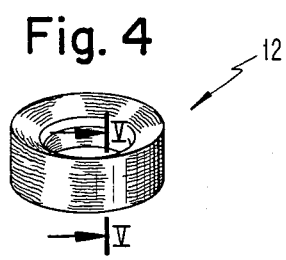
FIG. 4 shows a gasket according to the invention in a perspective view.

FIG. 5 shows a cross section of the gasket according to the line V—V in FIG. 4 in a magnification of about 5 times. FIGS. 6 and 7 show magnifications of the cross section surface both in the part that is most compacted (FIG. 6) and in the part of the gasket that due to the shape of the gasket becomes less compacted (FIG. 7).

The rectangular cross section shape of the wires 11 prevents them from cutting each other at compacting since they have relatively large abutment surfaces (see FIGS. 6 and 7) in contradiction to conventional gaskets in which the wires have abutment points between each other. This means that the number of wires is constant in the gasket, i.e. the wires do not break during the compacting process, which gives the gasket a good elasticity and a good strength during use. The dark areas between the wires are spaces which are isolated during mounting of the gasket. The wires in the stud are limited in numbers, preferably one to ten wires in each stud. Each wire is wound at least ten revolutions in the stud and thus in the gasket. The wire has a non-linear extension in the gasket. The gasket is gas tight at least in mounted position when the exhaust pipe is forced towards the branch pipe. The gasket is provided to maintain its good mechanical properties also at temperatures about 1000° C. The gasket is resilient and therefore it can minimize the transference of vibrations between two machine elements.

Figure 8:
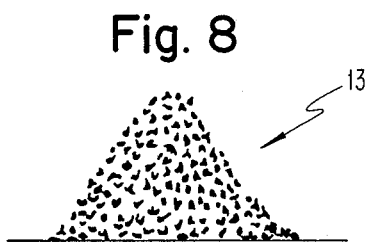
FIG. 8 shows a binder schematically.

Alternatively a binder 13 may be compacted together with the stud 10 in the compacting tool. The binder 13 is schematically illustrated in FIG. 8. The binder is provided to bind the wires together and to seal the spaces between the wires. The binder is selected from one or more of the periodic system groups 1B, 2A, 3A, 4A, 4B, 6B, 7A, 7B and 8B. Basalt or rare earth metals may also be used as binder. The binder may for example be in the shape of powder or fibers. The binder is distributed within the stud whereafter the stud and the binder is compacted under high temperature whereby the binder is melt and distributed; a process with is more closely described below. The porosity percentage of the gasket is between 0 to 40. The gasket containing the binder has close to 0 % porosity.

Figure 9:
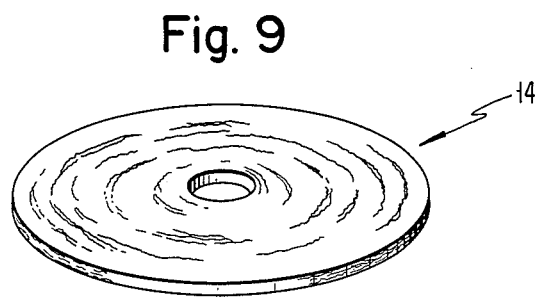
FIG. 9 shows a filter according to the invention in a perspective view.

FIG. 9 shows an alternative embodiment of a metallic element according to the invention. The metallic element is a filter 14 for separation of dissolved or solid substances in liquid or gas. The stud 10 has been compacted mainly in the axial direction and sintered whereby the wires lock each other during the compacting and sintering process such that the filter becomes and remains disc shaped. The filter has a central recess for a mounting device. The filter has mainly the same advantages regarding the mechanical properties as the above-described gasket. At the filter production pervious channels will remain within the filter. The filter has a porosity of between 40 and 95 %. A high porosity percentage, over 93, gives a slack filter and a low porosity percentage, around 50, gives a strong filter, however being hard to penetrate. The filter can have a shape different from the disc shape, for example it may be stud like.

One method of forming a metallic element such as a filter or a gasket includes the steps of providing the basic material consisting of the stud 10 being of non-woven type and comprising only a small number of coiled, mainly flat wires 11 being wound several revolutions around a central axis of the stud, placing said basic material in the reaction zone of a pressure apparatus (not shown), subjecting the basic material to conditions of elevated pressure, at least 0.2 N/mm$^2$, thereby allowing the coiled wires to deform plastically and to hook onto each other forming a compacted metallic element, allowing the conditions to return to ambient, i.e. normal pressure, recovering the compacted metallic element from the reaction zone, placing the compacted metallic element in the reaction zone of a high temperature apparatus (not shown), subjecting the compacted metallic element to conditions of elevated temperature, at least 1100° C., in order to partly sinter the wires together at each contact area of the wires, allowing the conditions to return to ambient, i.e. room temperature, and recovering the compacted and sintered metallic element from the reaction zone of the high temperature apparatus. Furthermore, the compacted and sintered metallic element may thereafter be placed into the reaction zone of a pressure apparatus, said element being subjected to conditions of elevated pressure, said conditions being allowed to return to ambient and the element is then recovered from the reaction zone of the pressure apparatus. The additional steps of this method provides a metallic element with very accurate dimensional tolerances.

Another method of forming a metallic element such as a filter or a gasket includes the steps of providing the basic material consisting of the stud 10 being of non-woven type and comprising only a small number of coiled, mainly flat wires 11 being wound several revolutions around a central axis of the stud, placing said basic material in the reaction zone of a pressure and high temperature apparatus, subjecting the basic material to conditions of elevated temperature, at least 1100° C., and pressure, at least 0.2 N/mm$^2$, thereby allowing the coiled wires to deform plastically and to hook and sinter onto each other forming the metallic element, allowing the conditions to return to ambient and recovering the metallic element from the reaction zone.

Still another method of forming a metallic element such as a filter or a gasket includes the steps of providing the basic material consisting of the stud 10 being of non-woven type and comprising only a small number of coiled, mainly flat wires 11 being wound several revolutions around a central axis of the stud, placing said basic material in the reaction zone of a pressure apparatus subjecting the basic material to conditions of elevated pressure, at least 0.2 N/mm$^2$, thereby allowing the coiled wires to deform plastically and to hook onto each other forming a compacted metallic element, allowing the conditions to return to ambient, loosening said reaction zone, containing said compacted metallic element, from said pressure apparatus, i.e. dismounting parts of the pressure apparatus, placing said reaction zone into the reaction zone of a high temperature apparatus, subjecting the compacted metallic element to conditions of elevated temperature, at least 1100° C., in order to partly sinter the wires together, allowing the conditions to return to ambient, recovering the reaction zone of the pressure apparatus from the reaction zone of the high temperature apparatus and recovering the compacted and sintered metallic element from the reaction zone of the pressure apparatus.

When producing the gasket 12 which is sealed by the binder 13 the latter is distributed within the basic material at the first or second step of each above-mentioned method.

The basic material may be held within a container such as a metal pipe during the steps of the different methods such to put the metallic element in a readily usable state without the need for special fastening means. Then the periphery of the metallic element is metallically bound to the wall of the container due to sintering.

The metallic element may have alternative shapes other than the ones stated above such as a thin plate of about one or a few millimeters thickness, a pipe-like configuration or a thin ring.

The metallic elements may also be used in heat exchangers, gas mixers, gas spreaders or column packings for chemical processes.

Thus the invention relates to methods for producing a metallic element and a metallic element therefrom. The production methods are time saving and gives a good product. The metallic element has good chemical, mechanical and thermal properties.

We claim:

1. Metallic element including a number of closely compacted wires (11), said element having a center axis, characterized in that each wire (11) of the metallic element (12,14) has a mainly rectangular cross-section and is wound at least ten revolutions around said axis and in that each wire (11) has a coiled basic shape, said element (12;14) being comprised of a limited number of wires which are mutually interlocked by means of plastic deformation of the coils of the wires (11) and by means of mutual metallic binding of parts of the wires (11).

2. Metallic element according to claim 1, c h a r a c t e r i z e d in that it is a gasket (12) which is gas tight, said gasket having a circular basic shape and a central recess.

3. Metallic element according to claim 2, characterized in that a binder (13) seals pores between the wires of the metallic element and in that the binder consists of one or more from the periodic system groups 1B, 2A, 3A, 4A, 4B, 6B, 7A, 7B and 8B or of basalt or of rare earth metals.

4. Metallic element according to claim 1, characterized in that it is a filter (14) in which the coiled wires (11) engage each other at sintered areas while forming previous channels therebetween and in that the filter (14) has a porosity of between 40 to 95%.

5. Metallic element according to claim 4, characterized in that the filter (14) is circular and disc shaped and in that its thickness is less than its diameter.

6. Metallic element according to claim 1, characterized in that the wire (11) consists of austenitic, ferritic or alloyed steel.

* * * * *